United States Patent
Jiang

(10) Patent No.: US 9,965,213 B2
(45) Date of Patent: May 8, 2018

(54) IP HARD DISK AND STORAGE SYSTEM, AND DATA OPERATION METHODS THEREFOR

(71) Applicant: Huawei Technologies Co., Ltd., Shenzhen (CN)

(72) Inventor: Bo Jiang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/386,364

(22) Filed: Dec. 21, 2016

(65) Prior Publication Data

US 2017/0102900 A1 Apr. 13, 2017

Related U.S. Application Data

(63) Continuation of application No. PCT/CN2015/072813, filed on Feb. 11, 2015.

(30) Foreign Application Priority Data

Jun. 24, 2014 (CN) .......................... 2014 1 0286947

(51) Int. Cl.
*G06F 12/00* (2006.01)
*G06F 3/06* (2006.01)
(Continued)

(52) U.S. Cl.
CPC ............ *G06F 3/0647* (2013.01); *G06F 3/067* (2013.01); *G06F 3/0622* (2013.01);
(Continued)

(58) Field of Classification Search
CPC ....... G06F 3/0622; G06F 3/0647; G06F 3/067
(Continued)

(56) References Cited

U.S. PATENT DOCUMENTS 8,321,854 B1* 11/2012 Zarafyants .............. G06F 8/427
717/112
2004/0117438 A1* 6/2004 Considine ........... G06F 11/2074
709/203
(Continued)

FOREIGN PATENT DOCUMENTS

CN 1340765 A 3/2002
CN 101442548 A 5/2009
(Continued)

OTHER PUBLICATIONS

Machine Translation and Abstract of Chinese Publication No. CN1340765, Mar. 20, 2002, 10 pages.
(Continued)

*Primary Examiner* — Mardochee Chery
(74) *Attorney, Agent, or Firm* — Conley Rose, P.C.

(57) ABSTRACT

A data operation method for a storage system is applied to a storage system that includes an access node and at least two internet protocol (IP) hard disks, including sending, by the access node, a data migration instruction to a first IP hard disk, where the data migration instruction includes an identifier of a target virtual storage partition, the data migration instruction is used to instruct data in the target virtual storage partition to be migrated to a second IP hard disk; and receiving, by the first IP hard disk, the data migration instruction, reading the data in the target virtual storage partition according to the identifier of the target virtual storage partition, and writing the data in the target virtual storage partition into the second IP hard disk. The present system and method can be applied to migration of data in an IP hard disk.

6 Claims, 11 Drawing Sheets

(51) Int. Cl.
  *H04L 29/06* (2006.01)
  *H04L 29/12* (2006.01)
  *H04L 29/08* (2006.01)
  *H04L 12/24* (2006.01)

(52) U.S. Cl.
  CPC ...... *G06F 3/0659* (2013.01); *H04L 29/12047* (2013.01); *H04L 41/085* (2013.01); *H04L 61/15* (2013.01); *H04L 61/2007* (2013.01); *H04L 63/10* (2013.01); *H04L 67/1097* (2013.01); *H04L 69/06* (2013.01); *H04L 69/12* (2013.01); *H04L 69/16* (2013.01); *H04L 69/161* (2013.01); *H04L 69/166* (2013.01)

(58) Field of Classification Search
  USPC .......................................................... 711/112
  See application file for complete search history.

(56) References Cited

U.S. PATENT DOCUMENTS

| | | | |
|---|---|---|---|
| 2004/0123068 A1* | 6/2004 | Hashimoto | G06F 12/0866 711/206 |
| 2006/0129695 A1 | 6/2006 | Faibish et al. | |
| 2012/0303912 A1 | 11/2012 | Calder et al. | |

FOREIGN PATENT DOCUMENTS

| | | |
|---|---|---|
| CN | 103186350 A | 7/2013 |
| CN | 103703441 A | 4/2014 |
| CN | 103905335 A * | 7/2014 |
| CN | 104077239 A | 10/2014 |

OTHER PUBLICATIONS

Machine Translation and Abstract of Chinese Publication No. CN101442548, May 27, 2009, 9 pages.
Machine Translation and Abstract of Chinese Publication No. CN103186350, Jul. 3, 2013, 14 pages.
Machine Translation and Abstract of Chinese Publication No. CN104077239, Oct. 1, 2014, 18 pages.
Foreign Communication From a Counterpart Application, European Application No. 15812329.9, Extended European Search Report dated Jun. 8, 2017, 8 pages.
Foreign Communication From a Counterpart Application, PCT Application No. PCT/CN2015/072813, English Translation of International Search Report dated Apr. 29, 2015, 2 pages.
Foreign Communication From A Counterpart Application, PCT Application No. PCT/CN2015/072813, English Translation of Written Opinion dated Apr. 29, 2015, 23 pages.

* cited by examiner

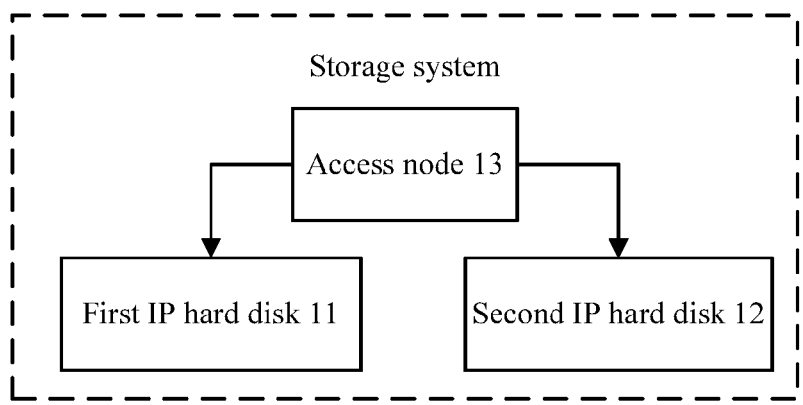

FIG. 1

S21: A first IP hard disk receives a data migration instruction sent by an access node, where the data migration instruction includes an identifier of a target virtual storage partition S22: The first IP hard disk reads data in the target virtual storage partition according to the identifier of the target virtual storage partition and writes the data in the target virtual storage partition into a second IP hard disk, where the partition routing table is updated according to an operation result

FIG. 2

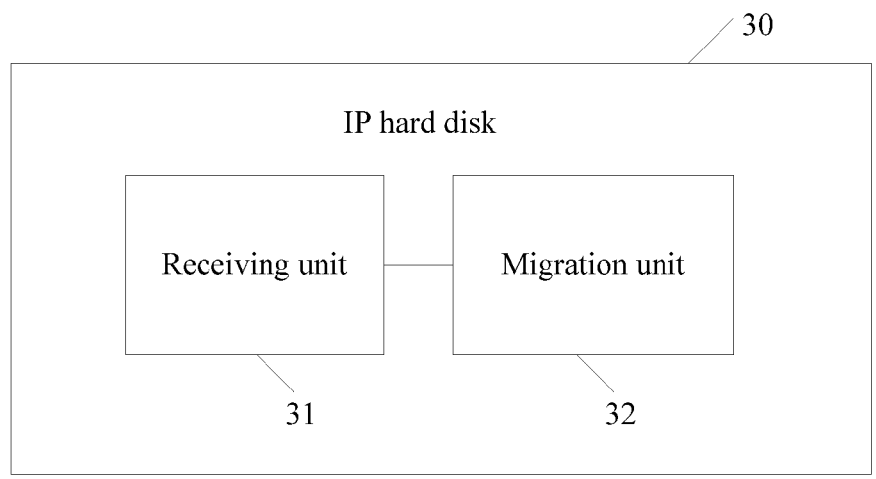

FIG. 3

S41: An IP hard disk receives a data operation instruction sent by an access node, where the data operation instruction includes an identifier of a target virtual storage partition

↓

S42: The IP hard disk performs an operation on data in the target virtual storage partition according to the identifier of the target virtual storage partition, where the operation corresponds to the data operation instruction

FIG. 4

IP HARD DISK AND STORAGE SYSTEM, AND DATA OPERATION METHODS THEREFOR

CROSS-REFERENCE TO RELATED APPLICATION

This application is a continuation of International Application No. PCT/CN2015/072813, filed on Feb. 11, 2015, which claims priority to Chinese Patent Application No. 201410286947.3, filed on Jun. 24, 2014, both of which are hereby incorporated by reference in their entireties.

TECHNICAL FIELD

The present disclosure relates to the field of network technologies, and in particular, to an Internet Protocol (IP) hard disk and a storage system, and data operation methods therefor.

BACKGROUND

With the development of Internet and storage technologies, network storage technologies have been gradually widely used. In a network storage technology, an access node and multiple IP hard disks are configured in a distributed storage system, and the access node and the multiple IP hard disks form a cluster for storage of data. An IP hard disk is provided with an Ethernet interface and can be connected to the access node. The access node writes data into the IP hard disks or reads data from the IP hard disks.

In the access node, data is usually stored in a key-value form, that is, primary keys plus data. In the prior art, when an operation is performed on a key value, an access node needs to deliver an operation instruction with respect to a primary key to an IP hard disk in a cluster, so as to implement the operation on the key value.

In a process of the foregoing key value operation, when massive key values need to be operated, the access node needs to deliver massive operation instructions to IP hard disks. Consequently, bandwidth resources of the access node are occupied, which reduces work efficiency of the access node.

SUMMARY

Embodiments of the present disclosure provide an IP hard disk and a storage system, and data operation methods therefor, which can improve work efficiency of an access node.

To achieve the foregoing objective, the following technical solutions are used in the embodiments of the present disclosure.

According to a first aspect, a data operation method for an IP hard disk is provided, where the method is applied to a storage system, the storage system includes an access node and at least two IP hard disks, and the method includes receiving, by a first IP hard disk, a data migration instruction sent by the access node, where the data migration instruction includes an identifier of a target virtual storage partition, and the first IP hard disk includes the target virtual storage partition; and reading, by the first IP hard disk, data in the target virtual storage partition according to the identifier of the target virtual storage partition, and writing the data in the target virtual storage partition into a second IP hard disk.

With reference to the first aspect, in a first possible implementation manner of the first aspect, the reading, by the first IP hard disk, data in the target virtual storage partition according to the identifier of the target virtual storage partition includes performing, by the first IP hard disk, matching between the identifier of the target virtual storage partition and key values stored by the first IP hard disk; and obtaining and reading the data in the target virtual storage partition, where the key value includes a primary key that uses the identifier of the target virtual storage partition as a prefix.

According to a second aspect, an IP hard disk is provided, including a receiving unit configured to receive a data migration instruction sent by an access node, where the data migration instruction includes an identifier of a target virtual storage partition, the IP hard disk includes the target virtual storage partition, and the IP hard disk resides in a storage system that includes the access node and at least two IP hard disks; and a migration unit configured to read data in the target virtual storage partition according to the identifier of the target virtual storage partition, and write the data in the target virtual storage partition into another IP hard disk.

With reference to the second aspect, in a first possible implementation manner of the second aspect, the migration unit is configured to perform matching between the identifier of the target virtual storage partition and key values stored by the IP hard disk; and obtain and read the data in the target virtual storage partition, where the key value includes a primary key that uses the identifier of the target virtual storage partition as a prefix.

According to a third aspect, a data operation method for an IP hard disk is provided, where the method is applied to a storage system, the storage system includes an access node and an IP hard disk, and the method includes receiving, by the IP hard disk, a data operation instruction sent by the access node, where the data operation instruction includes an identifier of a target virtual storage partition, the data operation instruction includes a delete data instruction, a read data instruction, or a write data instruction, and the IP hard disk includes the target virtual storage partition; and performing, by the IP hard disk, an operation on data in the target virtual storage partition according to the identifier of the target virtual storage partition, where the operation corresponds to the data operation instruction.

With reference to the third aspect, in a first possible implementation manner of the third aspect, the performing, by the IP hard disk, an operation on data in the target virtual storage partition according to the identifier of the target virtual storage partition, where the operation corresponds to the data operation instruction includes performing, by the IP hard disk, matching between the identifier of the target virtual storage partition and key values of the IP hard disk; and performing an operation on a key value in the target virtual storage partition according to the data operation instruction, where the key value includes a primary key that uses the identifier of the target virtual storage partition as a prefix.

According to a fourth aspect, a data operation method for a storage system is provided, applied to a storage system that includes an access node and at least two IP hard disks, and including sending, by the access node, a data migration instruction to a first IP hard disk, where the data migration instruction includes an identifier of a target virtual storage partition, the data migration instruction is used to instruct data in the target virtual storage partition to be migrated to a second IP hard disk, and the first IP hard disk includes the target virtual storage partition; and receiving, by the first IP hard disk, the data migration instruction, reading the data in the target virtual storage partition according to the identifier of the target virtual storage partition, and writing the data in the target virtual storage partition into the second IP hard disk.

With reference to the fourth aspect, in a first possible implementation manner of the fourth aspect, the access node stores a correspondence between the identifier of the target virtual storage partition and the IP hard disk; and after the writing, by the first IP hard disk, the data in the target virtual storage partition into the second IP hard disk, the method further includes changing, by the access node, a correspondence between the identifier of the target virtual storage partition and the first IP hard disk to the correspondence between the identifier of the target virtual storage partition and the second IP hard disk.

With reference to the first possible implementation manner of the fourth aspect, in a second possible implementation manner of the fourth aspect, the sending, by the access node, a data migration instruction to a first IP hard disk includes determining, by the access node according to the correspondence between the identifier of the target virtual storage partition and the IP hard disk, that an IP hard disk in which the target virtual storage partition is located is the first IP hard disk, and sending the data migration instruction to the first IP hard disk.

With reference to the fourth aspect, in a third possible implementation manner of the fourth aspect, the reading, by the first IP hard disk, the data in the target virtual storage partition according to the identifier of the target virtual storage partition includes performing, by the first IP hard disk, matching between the identifier of the target virtual storage partition and key values stored by the first IP hard disk; and obtaining and reading the data in the target virtual storage partition, where the key value includes a primary key that uses the identifier of the target virtual storage partition as a prefix.

According to a fifth aspect, a storage system is provided, where the storage system includes an access node and at least two IP hard disks, where the access node is configured to send a data migration instruction to a first IP hard disk, where the data migration instruction includes an identifier of a target virtual storage partition, the data migration instruction is used to instruct data in the target virtual storage partition of the first IP hard disk to be migrated to a second IP hard disk, and the first IP hard disk includes the target virtual storage partition; and the first IP hard disk reads the data in the target virtual storage partition according to the identifier of the target virtual storage partition, and writes the data in the target virtual storage partition into the second IP hard disk.

With reference to the fifth aspect, in a first possible implementation manner of the fifth aspect, the access node stores a correspondence between the identifier of the target virtual storage partition and the first IP hard disk; and the access node is further configured to change the correspondence between the identifier of the target virtual storage partition and the first IP hard disk to a correspondence between the identifier of the target virtual storage partition and the second IP hard disk.

With reference to the first possible implementation manner of the fifth aspect, in a second possible implementation manner of the fifth aspect, the access node is configured to determine, according to the correspondence between the identifier of the target virtual storage partition and the IP hard disk, that an IP hard disk in which the target virtual storage partition is located is the first IP hard disk, and send the data migration instruction to the first IP hard disk.

With reference to the fifth aspect, in a third possible implementation manner of the fifth aspect, the first IP hard disk is configured to perform matching between the identifier of the target virtual storage partition and key values stored by the first IP hard disk; and obtain and read the data in the target virtual storage partition, where the key value includes a primary key that uses the identifier of the target virtual storage partition as a prefix.

According to a sixth aspect, a data operation method for a storage system is provided, applied to a storage system that includes an access node and an IP hard disk, and including sending, by the access node, a data operation instruction to the IP hard disk, where the data operation instruction includes an identifier of a target virtual storage partition, the data operation instruction includes a delete data instruction, a read data instruction, or a write data instruction, and the IP hard disk includes the target virtual storage partition; and receiving, by the IP hard disk, the data operation instruction and performing an operation on data in the target virtual storage partition according to the identifier of the target virtual storage partition, where the operation corresponds to the data operation instruction.

With reference to the sixth aspect, in a first possible implementation manner of the sixth aspect, the access node stores a correspondence between the identifier of the target virtual storage partition and the IP hard disk; and after the performing, by the IP hard disk, an operation on data in the target virtual storage partition, where the operation corresponds to the data operation instruction, the method further includes updating, by the access node, the correspondence between the identifier of the target virtual storage partition and the IP hard disk.

With reference to the first possible implementation manner of the sixth aspect, in a second possible implementation manner of the sixth aspect, the sending, by the access node, a data operation instruction to the IP hard disk includes determining, by the access node according to the correspondence between the identifier of the target virtual storage partition and the IP hard disk, an IP hard disk in which the target virtual storage partition is located, and sending the data operation instruction to the IP hard disk.

With reference to the sixth aspect, in a third possible implementation manner of the sixth aspect, the performing, by the IP hard disk, an operation on data in the target virtual storage partition according to the identifier of the target virtual storage partition, where the operation corresponds to the data operation instruction includes performing, by the IP hard disk, matching between the identifier of the target virtual storage partition and key values of the IP hard disk; and performing an operation on a key value in the target virtual storage partition according to the data operation instruction, where the key value includes a primary key that uses the identifier of the target virtual storage partition as a prefix.

According to a seventh aspect, a storage system is provided, including an access node and an IP hard disk, where the access node is configured to send a data operation instruction to the IP hard disk, where the data operation instruction includes an identifier of a target virtual storage partition, the data operation instruction includes a delete data instruction, a read data instruction, or a write data instruction, and the IP hard disk includes the target virtual storage partition; and the IP hard disk is configured to receive the data operation instruction and perform an operation on data in the target virtual storage partition according to the identifier of the target virtual storage partition, where the operation corresponds to the data operation instruction.

With reference to the seventh aspect, in a first possible implementation manner of the seventh aspect, the access node stores a correspondence between the identifier of the target virtual storage partition and the IP hard disk; the access node is configured to update the correspondence between the identifier of the target virtual storage partition and the IP hard disk.

With reference to the first possible implementation manner of the seventh aspect, in a second possible implementation manner of the seventh aspect, the access node is configured to determine, according to the correspondence between the identifier of the target virtual storage partition and the IP hard disk, an IP hard disk in which the target virtual storage partition is located, and send the data operation instruction to the IP hard disk.

With reference to the seventh aspect, in a third possible implementation manner of the seventh aspect, the IP hard disk is configured to perform matching between the identifier of the target virtual storage partition and key values of the IP hard disk; and perform an operation on a key value in the target virtual storage partition according to the data operation instruction, where the key value includes a primary key that uses the identifier of the target virtual storage partition as a prefix.

According to the IP hard disk and the storage system, and the data operation methods therefor provided by the embodiments of the present disclosure, a first IP hard disk receives a data migration instruction sent by an access node, reads data in a target virtual storage partition at a time according to an identifier of the target virtual storage partition carried in the data migration instruction, and writes the data at a time into a second IP hard disk. Because the data migration instruction is with respect to one virtual storage partition in the first IP hard disk, and a virtual storage partition identifier of the virtual storage partition is associated with primary keys of multiple key values, the first IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic diagram of a storage structure described in the present disclosure;

FIG. 2 is a flowchart of a data operation method for an IP hard disk according to Embodiment 1;

FIG. 3 is a schematic structural diagram of an IP hard disk according to Embodiment 2;

FIG. 4 is a flowchart of a data operation method for an IP hard disk according to Embodiment 3;

DESCRIPTION OF EMBODIMENTS

Figure 5:
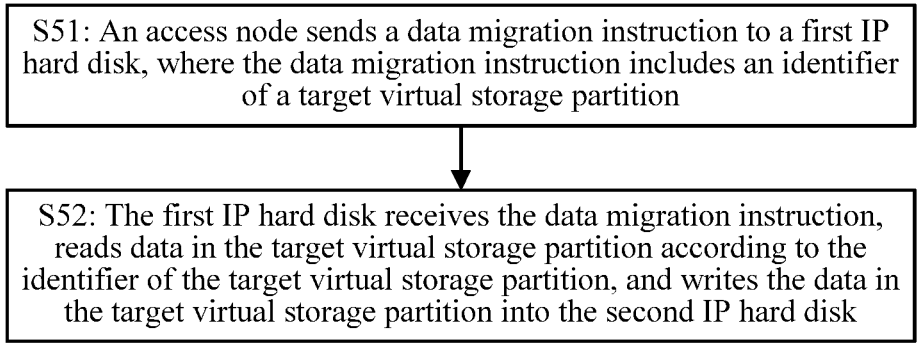
FIG. 5 is a flowchart of a data operation method for a storage system according to Embodiment 4.

The following provides detailed descriptions for a data operation method for an IP hard disk, and an apparatus of the embodiments of the present disclosure with reference to the accompanying drawings.

It should be clear that the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

As shown in FIG. 1, a storage system to which the present disclosure is applied includes at least two IP hard disks (a first IP hard disk 11 and a second IP hard disk 12) and an access node 13. The multiple IP hard disks and the access node 13 form a cluster, and the access node 13 is in communication connection with the IP hard disks. The storage system may include at least one cluster. The storage system to which the present disclosure is applied belongs to a network storage system and is configured to store data in a network. In the storage system, data transmission may be performed between the IP hard disks under control of the access node 13, or the IP hard disks may transmit data outwards under control of the access node 13. The IP hard disk refers to a hard disk in the network storage system, and works based on the IP protocol. In the network storage system, an IP hard disk is identified using an IP address or a Media Access Control (MAC) address.

It should be noted that the IP hard disk is a so-called smart hard disk or Ethernet-interface hard disk.

As shown in FIG. 2, Embodiment 1 provides a data operation method for an IP hard disk, including the following steps.

S21: A first IP hard disk receives a data migration instruction sent by an access node, where the data migration instruction includes an identifier of a target virtual storage partition.

In this embodiment, the first IP hard disk refers to an IP hard disk that is a part of a storage system; correspondingly, a second IP hard disk refers to another IP hard disk that is different from the first IP hard disk and that is a part of the storage system. As a data storage unit of an IP hard disk, a key value includes a primary key, a partition identifier of a virtual storage partition, and data stored in the virtual storage partition. The primary key may be a character string, each key value has a different primary key, and a primary key is used to identify a different key value. The virtual storage partition refers to a storage block obtained by means of logical partitioning on a physical IP hard disk, and each virtual storage partition includes multiple key values used as data storage units. In this case, the partition identifier and the primary keys are bound in the key values. A partition identifier is added to a conventional key-value (that is, a primary key plus data) form to form the key-value form described in the present disclosure (that is, a partition identifier plus a primary key plus data), where the partition identifier may be set to be a prefix of the primary key. It should be noted that the partition identifier may not only be used as a prefix of the primary key, but also be set to be in another location of the conventional key-value form, provided that the partition identifier can be read by the IP hard disk. Certainly, in order to satisfy a reading sequence, the partition identifier is preferably set to be a prefix of the primary key; in this way, higher efficiency can be achieved in a key-value migration, deletion, or reading process.

To ensure that the access node learns to which IP hard disk in a cluster a virtual storage partition belongs, a partition routing table needs to be virtually stored in the access node. A correspondence between an IP hard disk and a virtual storage partition in the IP hard disk is stored in the partition routing table. The access node can learn of a virtual storage partition included in an IP hard disk using the partition routing table. Therefore, when needing to perform a data operation, the access node can learn an IP hard disk that the virtual storage partition is located in, and an operation can be performed with respect to a key value in the virtual storage partition. The partition identifier of the virtual storage partition may be a set partition number, or may be an identifier in another form. The IP hard disk may be identified using an IP address, or may be identified using a MAC address.

In this step, the first IP hard disk receives the data migration instruction sent by the access node, where the data migration instruction includes the identifier of the target virtual storage partition, and the first IP hard disk includes the target virtual storage partition.

The access node sends the data migration instruction to the first IP source IP hard disk, the first IP hard disk receives the data migration instruction and performs a migration operation in step S22 on several key values included in the target virtual storage partition according to the data migration instruction.

S22: The first IP hard disk reads data in the target virtual storage partition according to the identifier of the target virtual storage partition and writes the data in the target virtual storage partition into a second IP hard disk, where the partition routing table is updated according to an operation result.

In this step, the first IP hard disk that receives the data migration instruction can perform matching between the identifier of the target virtual storage partition and key values stored by the first IP hard disk, that is, virtual storage partition identifiers of the key values stored by the first IP hard disk are searched according to the identifier of the target virtual storage partition, so as to determine a key value corresponding to the identifier of the target virtual storage partition. Afterwards, the first IP hard disk obtains and reads the data in the target virtual storage partition, where the key value includes a primary key that uses the identifier of the target virtual storage partition as a prefix.

In a specific implementation manner of Embodiment 1, after an IP hard disk performs a data migration operation on a virtual storage partition according to a partition routing table, a relationship between the virtual storage partition and the corresponding IP hard disk may change. In this case, the access node needs to adjust a correspondence between the virtual storage partition and the IP hard disk, that is, updating the partition routing table. In addition to the data migration operation, the correspondence between the virtual storage partition and the IP hard disk also needs to be adjusted if an operation such as delete or write is performed on data.

For example, when a virtual storage partition of an IP hard disk needs to be migrated to another IP hard disk, the virtual storage partition does not exist in the original IP hard disk because the virtual storage partition has been migrated to the another IP hard disk. In this case, the IP hard disk corresponding to the virtual storage partition is changed to the IP hard disk in which the virtual storage partition is located after the migration. Therefore, a correspondence between an IP hard disk and a virtual storage partition can be maintained so as to maintain management of data in a cluster.

According to the data operation method for an IP hard disk provided by this embodiment of the present disclosure, a first IP hard disk receives a data migration instruction sent by an access node, reads data in a target virtual storage partition at a time according to an identifier of the target virtual storage partition carried in the data migration instruction, and writes the data at a time into a second IP hard disk. Because the data migration instruction is with respect to one virtual storage partition in the first IP hard disk, and a virtual storage partition identifier of the virtual storage partition is associated with primary keys of multiple key values, the first IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

Embodiment 2

Corresponding to Embodiment 1, Embodiment 2 of the present disclosure provides an IP hard disk. As shown in FIG. 3, the IP hard disk 30 includes a receiving unit 31 configured to receive a data migration instruction sent by an access node, where the data migration instruction includes an identifier of a target virtual storage partition, the IP hard disk 30 includes the target virtual storage partition, and the IP hard disk resides in a storage system that includes the access node and at least two IP hard disks; and a migration unit 32 configured to read data in the target virtual storage partition according to the identifier of the target virtual storage partition, and write the data in the target virtual storage partition into another IP hard disk.

According to the IP hard disk provided by Embodiment 2, a first IP hard disk can read data in a target virtual storage partition at a time according to an identifier of the target virtual storage partition carried in a data migration instruction, and writes the data at a time into a second IP hard disk. Because the data migration instruction is with respect to one virtual storage partition in the first IP hard disk, and a virtual storage partition identifier of the virtual storage partition is associated with primary keys of multiple key values, the first IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

Embodiment 3

A data operation method for an IP hard disk provided by Embodiment 3 is applied to a storage system, where the storage system includes an access node and an IP hard disk. As shown in FIG. 4, the method includes the following steps.

S41: The IP hard disk receives a data operation instruction sent by the access node, where the data operation instruction includes an identifier of a target virtual storage partition.

In this embodiment, the data operation instruction includes a delete data instruction, a read data instruction, or a write data instruction, and the IP hard disk includes the target virtual storage partition.

The data operation instruction includes at least an operation type and a partition identifier of a to-be-operated virtual storage partition. When the access node performs an operation with respect to one virtual storage partition, the IP hard disk acquires a data operation instruction, where the data operation instruction also includes a partition identifier of the virtual storage partition. Then, the IP hard disk may scan for all key values that include the partition identifier according to the partition identifier, and perform different partition operations according to different instructions. Types of the partition operations herein include at least delete, read, and write, and certainly, another data operation instruction for batch processing may also be included, which is not limited herein.

S42: The IP hard disk performs an operation on data in the target virtual storage partition according to the identifier of the target virtual storage partition, where the operation corresponds to the data operation instruction.

The following separately describes that the data operation instruction is a delete data instruction, that the data operation instruction is a read data instruction, and that the data operation instruction is a write data instruction.

When the data operation instruction is a delete data instruction, to improve efficiency of data deletion from the IP hard disk and improve reliability of data deletion, in an implementation manner of Embodiment 3, the IP hard disk receives the delete data instruction delivered by the access node and deletes several key values included in the target virtual storage partition one by one according to the delete data instruction. The access node updates the partition routing table according to an operation result, that is, deleting a correspondence between the target virtual storage partition and the IP hard disk in the partition routing table.

The access node sends the delete data instruction, so that the IP hard disk scans for key values in the target virtual storage partition according to the delete data instruction, and deletes the key values in the virtual storage partition one by one, which avoids a need of delivering operation instructions one by one to enable the IP hard disk to complete data deletion, and thereby reduces occupied resources of the access node and improves reliability of operations on data in the IP hard disk.

When the data operation instruction is a read data instruction, when the access node reads data in the IP hard disk, to reduce data communication between the access node and the IP hard disk, in another possible implementation manner of Embodiment 3, the access node sends the read data instruction to the IP hard disk, and the IP hard disk receives the read data instruction and sends several key values included in the target virtual storage partition to a target device one by one according to the read data instruction. Then, the access node updates the partition routing table according to an operation result, that is, maintaining a correspondence between the target storage partition and the IP hard disk in the partition routing table.

When reading data in the IP hard disk, the access node sends one read data instruction, so that the IP hard disk scans for all data keys in the target virtual storage partition and sends all the data to the access node piece by piece, and further, the access node can forward the received key values to the target device. In this way, there is no need for the access node to deliver a read instruction with respect to each key value, which decreases operation instructions that need to be delivered by the access node during data reading and reduces occupied resources of the access node.

It should be noted that the target device is normally a terminal used by a user, but may also be another access node. This is because the access node needs to be used when another access node needs to call a key value in an IP hard disk managed by the access node. In this case, the another access node becomes a target device when the access node sends the key value.

In addition, after the key value is read, the key value may still be maintained in the IP hard disk; therefore, the access node does not need to update the partition routing table.

When the data operation instruction is a write data instruction, when the access node writes data into the IP hard disk, to reduce data communication between the access node and the IP hard disk, in another possible implementation manner of Embodiment 3, the access node sends the write data instruction to the IP hard disk, and the IP hard disk receives the write data instruction and writes several key values into the target virtual storage partition one by one according to the write data instruction. Then, the access node updates the partition routing table according to an operation result, that is, maintaining a correspondence between the target storage partition and the IP hard disk in the partition routing table.

When the access node writes data into the IP hard disk, a key value that includes a primary key and a partition identifier of a virtual storage partition is formed, and the key value is written into a corresponding virtual storage partition of the IP hard disk. In this way, the key value that includes the partition identifier of the virtual storage partition and the primary key is formed when data is written, so as to achieve an objective of performing a batch operation on the data that is newly written, thereby reducing occupied resources of the access node.

According to the foregoing, in Embodiment 3 and the specific implementation manners of Embodiment 3, an IP hard disk can perform, according to an identifier of a target virtual storage partition carried in a data operation instruction, a corresponding operation such as delete, read, or write at a time on data corresponding to the target virtual storage partition. Because the data operation instruction is with respect to one virtual storage partition in the IP hard disk, and a partition identifier of the virtual storage partition is associated with primary keys of multiple key values, the IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

Embodiment 4

Corresponding to Embodiment 1, Embodiment 4 further provides a data operation method for a storage system, which is applied to the storage system shown in FIG. 1 that includes an access node and at least two IP hard disks. The IP hard disk includes several virtual storage partitions, and each virtual storage partition is provided with a partition identifier; each virtual storage partition stores several key values; each key value includes at least a primary key and a partition identifier that is set for a virtual storage partition that stores the key value. As shown in FIG. 5, the method includes the following steps.

S51: The access node sends a data migration instruction to a first IP hard disk, where the data migration instruction includes an identifier of a target virtual storage partition.

In this step, the data migration instruction is used to instruct data in the target virtual storage partition of the first IP hard disk to be migrated to a second IP hard disk, where the first IP hard disk includes the target virtual storage partition.

The access node may determine, according to a correspondence between the identifier of the target virtual storage partition and an IP hard disk, that an IP hard disk in which the target virtual storage partition is located is the first IP hard disk, and send the data migration instruction to the first IP hard disk. The correspondence between the identifier of the target virtual storage partition and an IP hard disk is stored in the access node in a form of a partition routing table. The partition identifier of the virtual storage partition may be a set partition number, or may be an identifier in another form. The IP hard disk may be identified using an IP address, or may be identified using a MAC address.

S52: The first IP hard disk receives the data migration instruction, reads data in the target virtual storage partition according to the identifier of the target virtual storage partition, and writes the data in the target virtual storage partition into the second IP hard disk.

In this step, the first IP hard disk receives the data migration instruction, where the data migration instruction also includes a partition identifier of a virtual storage partition. Then, the IP hard disk may scan for all key values that include the partition identifier according to the partition identifier, and perform data migration operations according to different instructions. The first IP hard disk performs matching between the identifier of the target virtual storage partition and key values stored by the first IP hard disk; and obtains and reads the data in the target virtual storage partition, where the key value includes a primary key that uses the identifier of the target virtual storage partition as a prefix.

In a specific implementation manner of Embodiment 4, after the first IP hard disk writes the data in the target virtual storage partition into the second IP hard disk, the method further includes changing, by the access node, a correspondence between the identifier of the target virtual storage partition and the first IP hard disk to a correspondence between the identifier of the target virtual storage partition and the second IP hard disk.

According to the data operation method for a storage system provided by this embodiment of the present disclosure, a first IP hard disk receives a data migration instruction sent by an access node, reads data in a target virtual storage partition at a time according to an identifier of the target virtual storage partition carried in the data migration instruction, and writes the data at a time into a second IP hard disk. Because the data migration instruction is with respect to one virtual storage partition in the first IP hard disk, and a virtual storage partition identifier of the virtual storage partition is associated with primary keys of multiple key values, the first IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

In addition, it should be noted that an IP hard disk may include one or more virtual storage partitions, and the present disclosure does not limit a quantity of virtual storage partitions in one IP hard disk.

Embodiment 5

Corresponding to Embodiment 4, Embodiment 5 further provides a storage system. As shown in FIG. 1, the storage system includes an access node 13 and at least two IP hard disks, that is, including at least a first IP hard disk 11 and a second IP hard disk 12.

The access node 13 is configured to send a data migration instruction to the first IP hard disk 11, where the data migration instruction includes an identifier of a target virtual storage partition, the data migration instruction is used to instruct data in the target virtual storage partition of the first IP hard disk 11 to be migrated to the second IP hard disk 12, and the first IP hard disk 11 includes the target virtual storage partition.

The access node 13 may determine, according to a correspondence between the identifier of the target virtual storage partition and the IP hard disk, that an IP hard disk in which the target virtual storage partition is located is the first IP hard disk 11, and send the data migration instruction to the first IP hard disk 11.

The first IP hard disk 11 is configured to read the data in the target virtual storage partition according to the identifier of the target virtual storage partition, and write the data in the target virtual storage partition into the second IP hard disk.

The first IP hard disk 11 is configured to perform matching between the identifier of the target virtual storage partition and key values stored by the first IP hard disk 11; and obtain and read the data in the target virtual storage partition, where the key value includes a primary key that uses the identifier of the target virtual storage partition as a prefix.

According to the storage system provided by Embodiment 5 of the present disclosure, a first IP hard disk receives a data migration instruction sent by an access node, reads data in a target virtual storage partition at a time according to an identifier of the target virtual storage partition carried in the data migration instruction, and writes the data at a time into a second IP hard disk. Because the data migration instruction is with respect to one virtual storage partition in the first IP hard disk, and a virtual storage partition identifier of the virtual storage partition is associated with primary keys of multiple key values, the first IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

In a specific implementation manner of Embodiment 5, the access node 13 is configured to, after the first IP hard disk writes the data in the target virtual storage partition into the second IP hard disk, change a correspondence between the identifier of the target virtual storage partition and the first IP hard disk to a correspondence between the identifier of the target virtual storage partition and the second IP hard disk.

Embodiment 6

Figure 6:
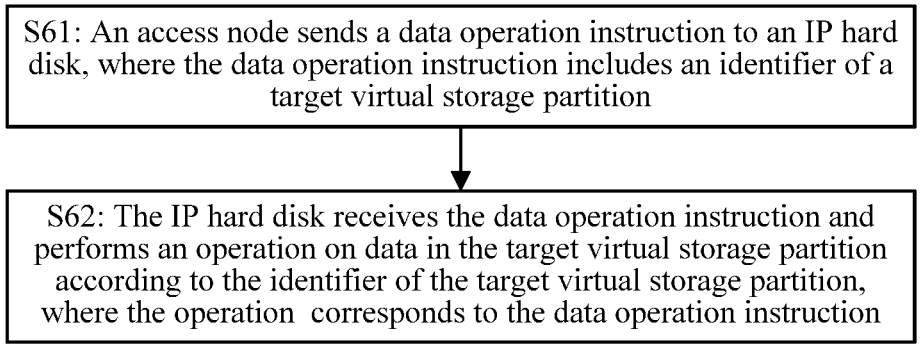
FIG. 6 is a flowchart of a data operation method for a storage system according to Embodiment 6.

Corresponding to Embodiment 3, Embodiment 6 further provides a data operation method for a storage system, which is applied to a storage system that includes an access node and an IP hard disk. As shown in FIG. 6, the method includes the following steps.

S61: The access node sends a data operation instruction to an IP hard disk, where the data operation instruction includes an identifier of a target virtual storage partition.

The data operation instruction includes a delete data instruction, a read data instruction, or a write data instruction, and the IP hard disk includes the target virtual storage partition.

The access node determines, according to a correspondence between the identifier of the target virtual storage partition and the IP hard disk, an IP hard disk in which the target virtual storage partition is located, and sends the data operation instruction to the IP hard disk.

S62: The IP hard disk receives the data operation instruction and performs an operation on data in the target virtual storage partition according to the identifier of the target virtual storage partition, where the operation corresponds to the data operation instruction.

The first IP hard disk performs matching between the identifier of the target virtual storage partition and key values of the first IP hard disk; and performs an operation on a key value in the target virtual storage partition according to the data operation instruction, where the key value includes a primary key that uses the identifier of the target virtual storage partition as a prefix.

According to the data operation method for a storage system provided by Embodiment 6, an IP hard disk performs, according to an identifier of a target virtual storage partition carried in a data operation instruction, a corresponding operation such as delete, read, or write at a time on data corresponding to the target virtual storage partition. Because the data operation instruction is with respect to one virtual storage partition in a first IP hard disk, and a virtual storage partition identifier of the virtual storage partition is associated with primary keys of multiple key values, the IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

In a specific implementation manner of Embodiment 6, the access node stores a correspondence between the identifier of the target virtual storage partition and the IP hard disk; after the IP hard disk performs the operation on the data in the target virtual storage partition, where the operation corresponds to the data operation instruction, the method further includes updating, by the access node, the correspondence between the identifier of the target virtual storage partition and the IP hard disk.

Embodiment 7

Figure 7:
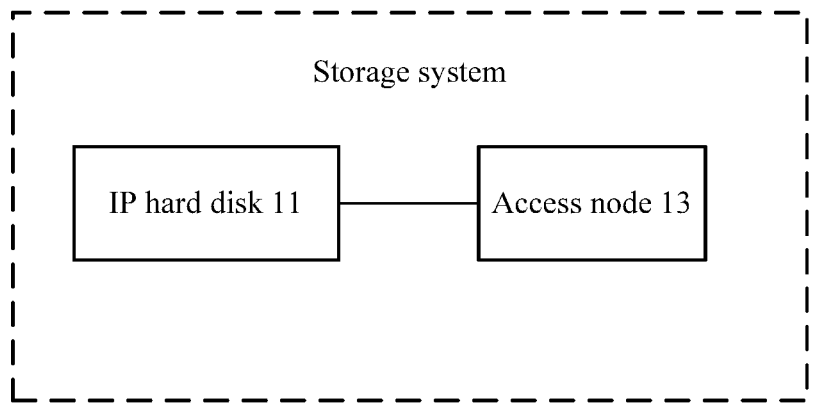
FIG. 7 is a schematic diagram of a storage system according to Embodiment 7.

Corresponding to Embodiment 6, Embodiment 7 further provides a storage system. As shown in FIG. 7, the storage system includes an IP hard disk 11 and an access node 13, where there may be one or more IP hard disks. FIG. 7 is described using an example in which there may be one IP hard disk.

In the storage system, the access node 13 is configured to send a data operation instruction to the IP hard disk 11, where the data operation instruction includes an identifier of a target virtual storage partition.

The data operation instruction includes a delete data instruction, a read data instruction, or a write data instruction, and the IP hard disk includes the target virtual storage partition. The access node 13 is configured to determine, according to a correspondence between an identifier of a target virtual storage partition and an IP hard disk, an IP hard disk in which the target virtual storage partition is located, and send a data operation instruction to the IP hard disk.

The IP hard disk 11 is configured to receive the data operation instruction and perform an operation on data in the target virtual storage partition according to the identifier of the target virtual storage partition, where the operation corresponds to the data operation instruction.

The IP hard disk 11 performs matching between the identifier of the target virtual storage partition and key values of the IP hard disk 11; and performs an operation on a key value in the target virtual storage partition according to the data operation instruction, where the key value includes a primary key that uses the identifier of the target virtual storage partition as a prefix.

According to the storage system provided by Embodiment 7, an IP hard disk performs, according to an identifier of a target virtual storage partition carried in a data operation instruction, a corresponding operation such as delete, read, or write at a time on data corresponding to the target virtual storage partition. Because the data operation instruction is with respect to one virtual storage partition in the IP hard disk, and a virtual storage partition identifier of the virtual storage partition is associated with primary keys of multiple key values, the IP hard disk can acquire an operation instruction with respect to multiple key values in the virtual storage partition at a time, so as to reduce a quantity of times an operation instruction needs to be delivered by the access node during data operations, and further reduce an amount of communication between the access node and IP hard disks and occupied resources of the access node, and improve work efficiency of the access node.

In an implementation manner of Embodiment 7, the access node 13 stores a correspondence between the identifier of the target virtual storage partition and the IP hard disk; and the access node 13 is configured to update the correspondence between the identifier of the target virtual storage partition and the IP hard disk.

Embodiment 8

Figure 8:
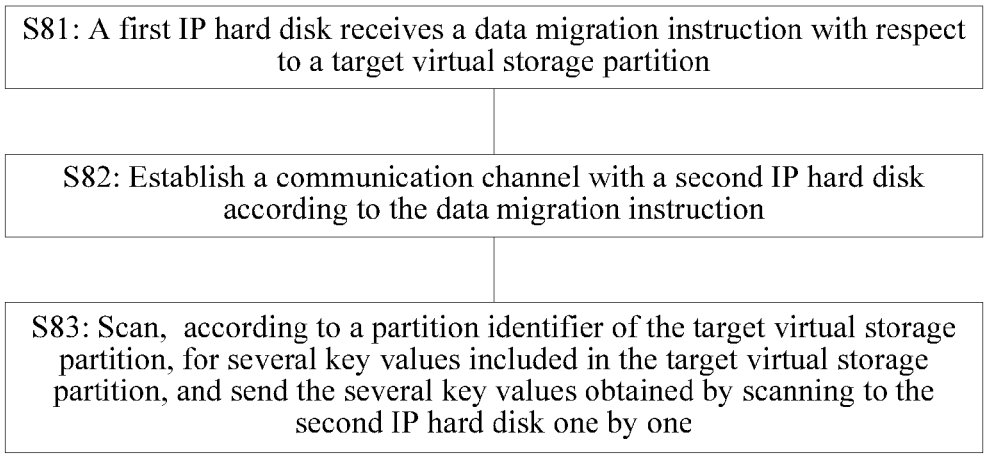
FIG. 8 is a flowchart of a data operation method for an IP hard disk according to Embodiment 8.

To further describe Embodiment 1, the following describes migration of a key value in an IP hard disk in Embodiment 8. As shown in FIG. 8, a data operation method for an IP hard disk includes the following steps.

S81: A first IP hard disk receives a data migration instruction with respect to a target virtual storage partition.

S82: Establish a communication channel with a second IP hard disk according to the data migration instruction.

S83: Scan for several key values included in the target virtual storage partition according to a partition identifier of the target virtual storage partition, and send the several key values obtained by scanning to the second IP hard disk one by one.

When receiving the data migration instruction delivered by an access node, the first IP hard disk first learns from the data migration instruction that a partition operation type is migrate and acquires an identifier, for example, the foregoing IP address or the foregoing MAC address, of a target IP hard disk from the data migration instruction. Then, the first IP hard disk sends a communication request to the target IP hard disk according to the data migration instruction. The target IP hard disk provides a feedback for the communication request after receiving the communication request. When the first IP hard disk receives the feedback, it indicates that a communication channel can be established for performing data migration. When the first IP hard disk receives no feedback within a preset time interval, it indicates that a communication channel cannot be established, and in this case, the first IP hard disk needs to feed back, to the access node, that a partition migration operation cannot be completed.

In this way, the delivered data migration instruction may be used to ensure that communication can be automatically established between the two IP hard disks by establishing a communication channel, and data migration is performed in a unit of a virtual storage partition. Therefore, there is no need for the access node to deliver migration instructions one by one. After the communication channel is established and data migration starts, there is no need for the access node to retain a communication connection to the IP hard disks to complete delivery of a data operation instruction; and data migration can be completed only over the communication channel between the first IP hard disk and the target IP hard disk, which reduces occupied resources of the access node and improves work efficiency of the access node.

In addition, because the first IP hard disk and the target IP hard disk establish communication automatically, there is no need to occupy a network resource of the access node for transfer of migrated data, which further reduces consumption of resources of the access node and improves efficiency of data migration.

In addition, even if an exception occurs on the access node in a key value migration process, data migration can be completed successfully, which improves reliability of a data operation.

Embodiment 9

To further describe Embodiment 3, the following describes an operation on a key value in an IP hard disk in this embodiment. For deleting of a key value from an IP hard disk, a data operation method for an IP hard disk includes receiving, by the IP hard disk, a delete data instruction with respect to a target virtual storage partition; and deleting, by the IP hard disk one by one according to a partition identifier of the target virtual storage partition, several key values that are obtained by scanning and that are included in the target virtual storage partition.

The IP hard disk receives the delete data instruction delivered by an access node, then, scans for the key values in the target virtual storage partition according to the delete data instruction, and deletes the key values in the virtual storage partition one by one, which avoids a need of delivering operation instructions one by one to enable the IP hard disk to complete data deletion, and thereby reduces occupied resources of the access node and improves reliability of operations on data in the IP hard disk.

For reading of a key value from an IP hard disk, the data operation method for an IP hard disk includes receiving a read data instruction with respect to a target virtual storage partition; and sending, to a target device one by one according to a partition identifier of the target virtual storage partition, several key values that are obtained by scanning and that are included in the target virtual storage partition.

When the IP hard disk receives an instruction from an access node for reading data in the IP hard disk, the IP hard disk scans for all data in the target virtual storage partition according to the delivered read data instruction and sends all the data to the access node piece by piece, so that the access node can forward a received key value to a target device. In this way, there is no need for the access node to deliver a read instruction with respect to each key value, which decreases operation instructions that need to be delivered by the access node during data reading and reduces occupied resources of the access node.

It should be noted that the target device is normally a terminal used by a user, but may also be another access node. This is because the access node needs to be used when another access node needs to call a key value in an IP hard disk managed by the access node. In this case, the another access node becomes a target device when the access node sends the key value.

In addition, after the key value is read, the key value may still be maintained in the IP hard disk; therefore, the access node does not need to update a partition routing table.

To implement writing of data into an IP hard disk, after a write instruction is received, the data operation method for an IP hard disk includes receiving, by the IP hard disk, a to-be-written key value, where the to-be-written key value includes a primary key and an identifier of a to-be-written-into partition corresponding to the primary key; and writing, by the IP hard disk according to the identifier of the to-be-written-into partition and the primary key, the to-be-written key value into a virtual storage partition corresponding to the identifier of the to-be-written-into partition.

The primary key and a partition identifier of the virtual storage partition are allocated by an access node to data, and a to-be-written key value is formed according to the partition identifier and the primary key.

When the access node writes data into the IP hard disk, a key value that includes a primary key and a partition identifier of a virtual storage partition is formed, and the key value is written into a corresponding virtual storage partition of the IP hard disk. In this way, the key value that includes the partition identifier of the virtual storage partition and the primary key is formed when data is written, so as to achieve an objective of performing a batch operation on the data that is newly written, thereby reducing occupied resources of the access node.

Embodiment 10

To ensure that a person skilled in the art better understands the technical solution of the data operation method for a storage system provided by the present disclosure, the following describes in detail the data operation method for an IP hard disk described in the present disclosure with reference to a specific implementation manner.

Figure 9:
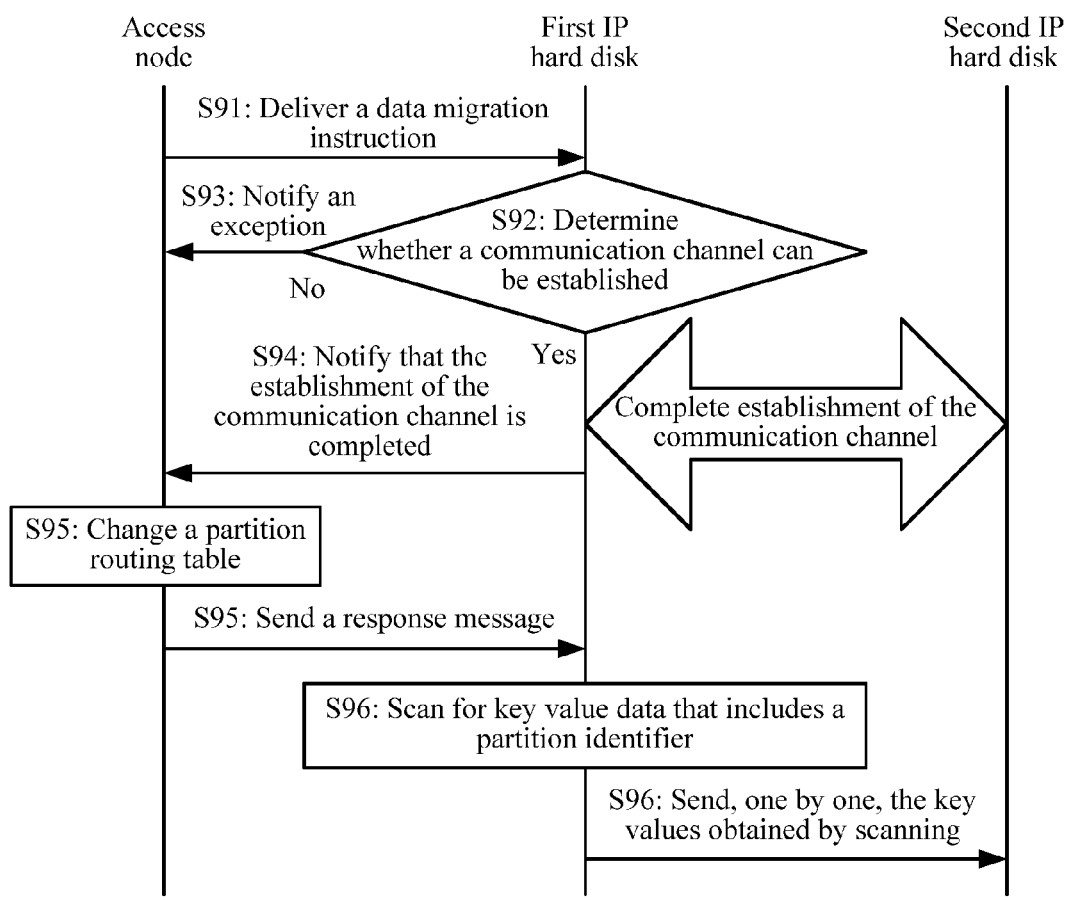
FIG. 9 is a flowchart of a data operation method for a storage system according to Embodiment 10.

As shown in FIG. 9, a cluster includes an access node, a first IP hard disk, and a second IP hard disk, where the first IP hard disk includes a first virtual storage partition, a second virtual storage partition, and a third virtual storage partition. A partition routing table stores a correspondence between the first virtual storage partition, the second virtual storage partition and the third virtual storage partition, and the first IP hard disk. A virtual storage partition may also be configured in the second IP hard disk, and the partition routing table also stores a correspondence between the second IP hard disk and the virtual storage partition. However, the virtual storage partition configured in the second IP hard disk is not shown in FIG. 3.

In this embodiment, as shown in FIG. 9, a data operation method for an IP hard disk includes the following steps.

S91: The access node sends a data migration instruction to the first IP hard disk.

For example, the data migration instruction includes a hard disk identifier of the second IP hard disk and a partition identifier of the first virtual storage partition included in the second IP hard disk. In this case, the second IP hard disk serves as a target IP hard disk.

S92: The first IP hard disk receives the data migration instruction and establishes a communication channel with the second IP hard disk according to a hard disk identifier of the second IP hard disk included in the data migration instruction.

In this case, there are two cases: one is that a communication channel can be established, that is, communication between the IP hard disks can be completed; the other is that a communication channel cannot be established, that is, there is an exception between the IP hard disks.

When there is an exception, data migration cannot be completed; in this case, step S93 needs to be performed in which the first IP hard disk notifies the access node of the exception. When there is no exception, step S94 is performed.

S94: When establishment of the communication channel is completed, the first IP hard disk notifies the access node that a data migration operation can be performed.

S95: The access node receives a notification sent by the first IP hard disk, changes a correspondence between the first IP hard disk and the first virtual storage partition in the partition routing table to a correspondence between the first virtual storage partition and the second IP hard disk, and sends a response message corresponding to the notification to the first IP hard disk.

S96: The first IP hard disk receives the response message, performs full-disk scanning to acquire a key value that includes a partition identifier of the first virtual storage partition, and sends the key value obtained by scanning to the second IP hard disk over the communication channel.

In this way, migration of data in an IP hard disk can be completed. In addition, in such a migration process, even if an exception occurs on the access node, a data migration service is completed between the IP hard disks independently over an established communication channel without forwarding by the access node, thereby avoiding an adverse influence brought by the access node exception on the migration between the IP hard disks. In addition, the omission of forwarding by the access node can also reduce occupied resources of the access node and improve resource usage efficiency of the access node.

Figure 10:
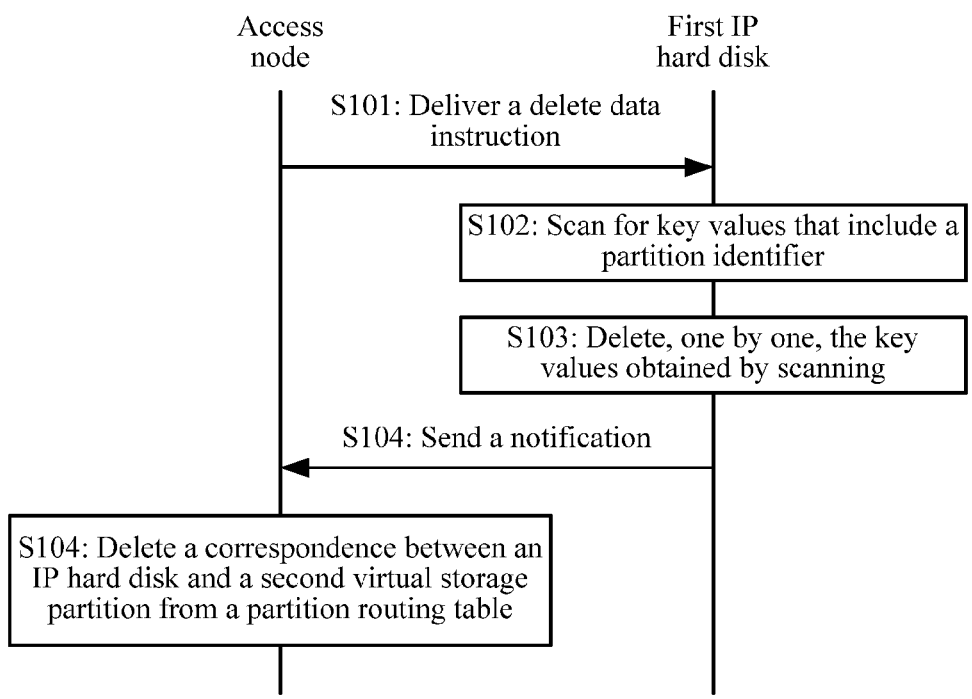
FIG. 10 is another flowchart of a data operation method for a storage system according to Embodiment 10.

When the access node deletes data, using the storage system shown in FIG. 1 as an example, the data operation method for an IP hard disk, as shown in FIG. 10, includes the following steps.

S101: The access node sends a delete data instruction to the first IP hard disk.

For example, the delete data instruction indicates that the second virtual storage partition in the first IP hard disk needs to be deleted.

S102: The first IP hard disk receives the delete data instruction and scans for key values that include a partition identifier of the second virtual storage partition.

S103: The first IP hard disk deletes, one by one, the key values obtained by scanning.

Using the partition identifier included in the delete data instruction, the first IP hard disk is enabled to scan for the key values that include the partition identifier to perform batch deletion directly, which avoids that the access node needs to deliver deletion instructions to the IP hard disk one by one to complete deletion of all the key values, improves efficiency of data deletion, and reduces occupied resources of the access node.

S104: After the deletion is completed, the first IP hard disk sends a notification to the access node, and the access node clears, according to the received deletion completion notification, a correspondence between second virtual storage partition and the first IP hard disk included in the partition routing table.

In addition, if one key value in one virtual storage partition needs to be deleted, it is only necessary to deliver a delete instruction that includes a partition identifier and a primary key to implement deletion of the key value from the virtual storage partition, which improves data operation flexibility. However, when one key value is deleted, the correspondence in the partition routing table is not updated.

Figure 11:
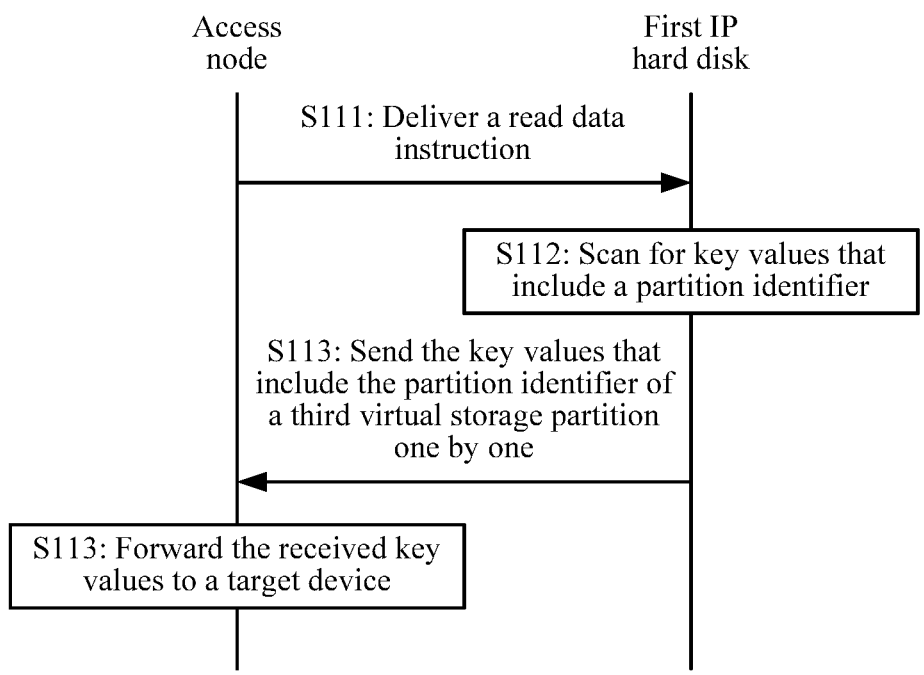
FIG. 11 is still another flowchart of a data operation method for a storage system according to Embodiment 10.

Data reading may also be implemented in a similar way. As shown in FIG. 11, the data operation method for an IP hard disk further includes the following steps.

S111: The access node sends a read data instruction to the first IP hard disk.

The read data instruction includes a partition identifier of the third virtual storage partition.

S112: The first IP hard disk receives the read data instruction and scans for key values that include the partition identifier of the third virtual storage partition according to the read data instruction.

S113: The first IP hard disk sends the key values that include the partition identifier of the third virtual storage partition to the access node one by one, and the access node forwards the key values to a target device.

Sending one read data instruction can enable an IP hard disk obtain, by scanning, all key values that include a partition identifier of a target virtual storage partition, without a need to send read data instructions one by one, which decreases a quantity of operation instructions sent by the access node to the IP hard disk and reduces occupied resources of the access node.

Figure 12:
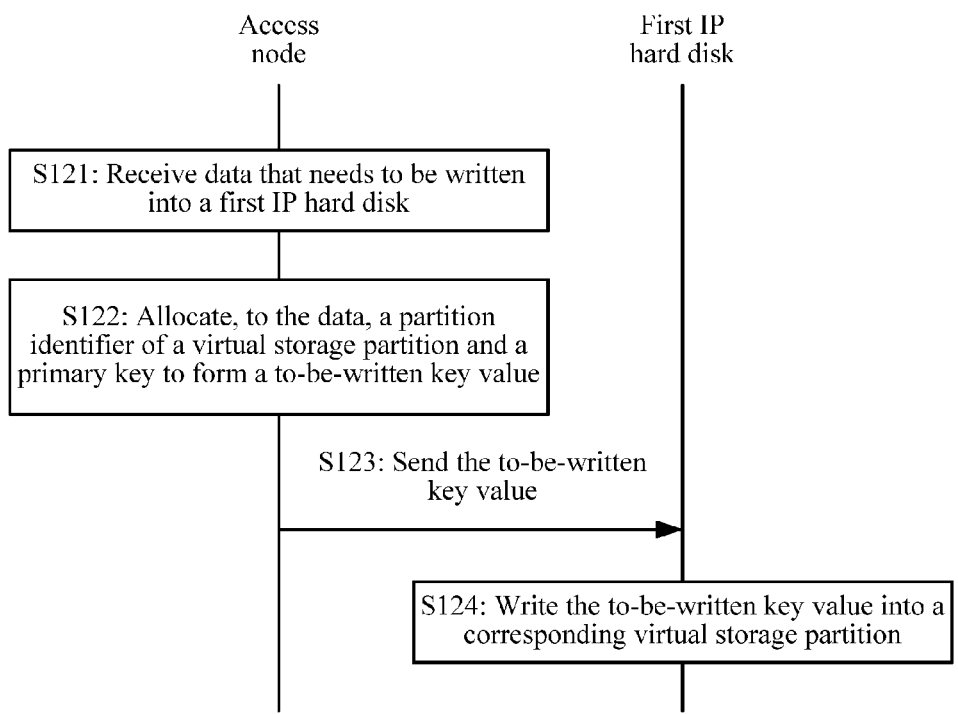
FIG. 12 is yet another flowchart of a data operation method for a storage system according to Embodiment 10.

When data needs to be written into an IP hard disk, as shown in FIG. 12, the data operation method for an IP hard disk includes the following steps.

S121: The access node receives data that needs to be written into the first IP hard disk.

S122: The access node allocates a primary key and a partition identifier of a virtual storage partition to the to-be-written data to form a to-be-written key value that includes the primary key and the partition identifier, where the partition identifier is a partition identifier of a first partition.

S123: The access node sends the to-be-written key value to the first IP hard disk, and the first IP hard disk writes the to-be-written key value into the first partition.

The access node allocates a partition identifier of a virtual storage partition and a primary key to the data, to enable the IP hard disk to write data into a corresponding partition. Further, the IP hard disk is enabled to support a batch data operation, so as to improve reliability of data operations and improve data operation efficiency of the access node.

Embodiment 11

Figure 13:
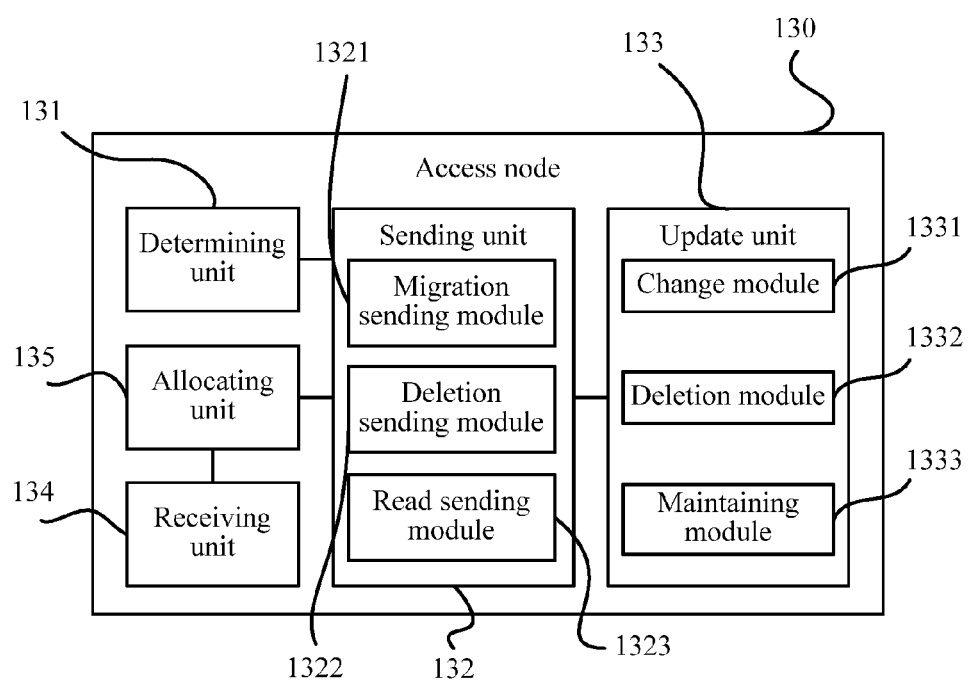
FIG. 13 is a schematic structural diagram of an access node according to Embodiment 11.

Corresponding to the foregoing data operation method for an IP hard disk, the present disclosure further provides an access node 130, which is applied to a cluster that includes an IP hard disk, as shown in FIG. 13. The IP hard disk includes several virtual storage partitions, each virtual storage partition is provided with a partition identifier; each virtual storage partition stores several key values; each key value includes at least a primary key and a partition identifier that is set for a virtual storage partition that stores the key value; the access node stores a partition routing table, and a correspondence between a virtual storage partition and an IP hard disk is stored in the partition routing table.

The access node 130 includes a determining unit 131 configured to determine, according to the partition routing table, a first IP hard disk corresponding to a target virtual storage partition; a sending unit 132 configured to deliver a partition operation instruction to the first IP hard disk, where the partition operation instruction includes at least a partition operation type and a partition identifier of a to-be-operated virtual storage partition, so that the first IP hard disk performs, one by one according to the partition operation type, an operation on several key values included in the target virtual storage partition; and an update unit 133 configured to update the partition routing table according to an operation result.

According to the access node provided by this embodiment of the present disclosure, a partition routing table is used to manage a correspondence between a virtual storage partition and an IP hard disk, so that the access node sends an operation instruction that is with respect to one virtual storage partition and that enables, based on an association between a virtual storage partition and a primary key that are included in a key value, an IP hard disk to obtain multiple key values in the one virtual storage partition, thereby reducing a quantity of operation instructions delivered by the access node during data operations, reducing an amount of communication between the access node and the IP hard disk and occupied resources of the access node, and improving work efficiency of the access node.

In a possible implementation manner of the present disclosure, to implement migration of a key value, the sending unit 132 includes a migration sending module 1321 configured to send a data migration instruction to the first IP hard disk, so that the first IP hard disk establishes a communication channel with a target IP hard disk according to the data migration instruction, and migrates several key values included in the target virtual storage partition to the target IP hard disk one by one; and the update unit 133 includes a change module 1331 configured to change, in the partition routing table, the first IP hard disk corresponding to the target virtual storage partition to the target IP hard disk.

In a possible implementation manner of the present disclosure, to implement deletion of a key value, the sending unit 132 includes a deletion sending module 1322 configured to deliver a delete data instruction to the first IP hard disk, so that the first IP hard disk deletes several key values included in the target virtual storage partition one by one according to the delete data instruction; and the update unit 133 includes a deletion module 1332 configured to delete a correspondence between the target virtual storage partition and the first IP hard disk from the partition routing table.

In a possible implementation manner of the present disclosure, to implement reading of a key value, the sending unit 132 includes a read sending module 1323 configured to deliver a read data instruction to the first IP hard disk, so that the first IP hard disk sends several key values included in the target virtual storage partition to a target device one by one according to the read data instruction; and the update unit 133 includes a maintaining module 1333 configured to maintain a correspondence between the target storage partition and the first IP hard disk in the partition routing table.

In another possible implementation manner, the access node 130 further includes a receiving unit 134 configured to receive data that needs to be written into a to-be-written-into IP hard disk; and an allocating unit 135 configured to allocate, to the data, a primary key and a to-be-written-into partition identifier corresponding to the primary key, to form a to-be-written key value that includes the primary key and the to-be-written-into partition identifier, where the sending unit 132 is further configured to send the to-be-written key value to the to-be-written-into IP hard disk, so that the to-be-written-into IP hard disk writes the to-be-written key value into a virtual storage partition corresponding to the to-be-written-into partition identifier.

Embodiment 12

Corresponding to the foregoing data operation method for an IP hard disk, the present disclosure further provides an IP hard disk, which is applied to a cluster. The IP hard disk includes several virtual storage partitions, and each virtual storage partition is provided with a partition identifier; each virtual storage partition stores several key values; each key value includes at least a primary key and a partition identifier that is set for a virtual storage partition that stores the key value.

Figure 14:
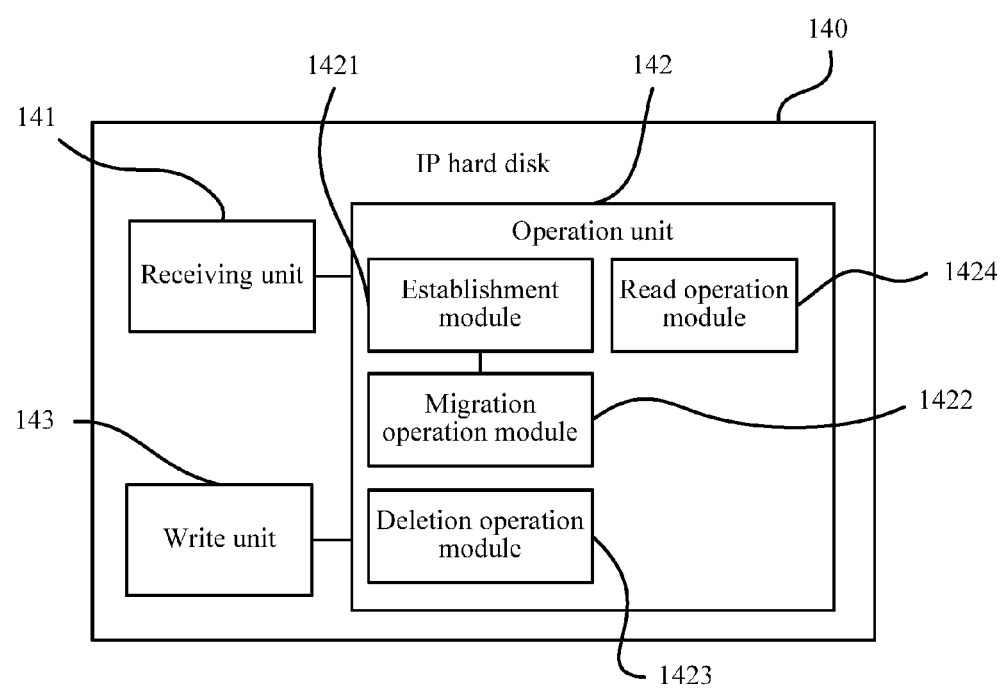
FIG. 14 is a schematic structural diagram of an IP hard disk according to Embodiment 12.
Figure 15:
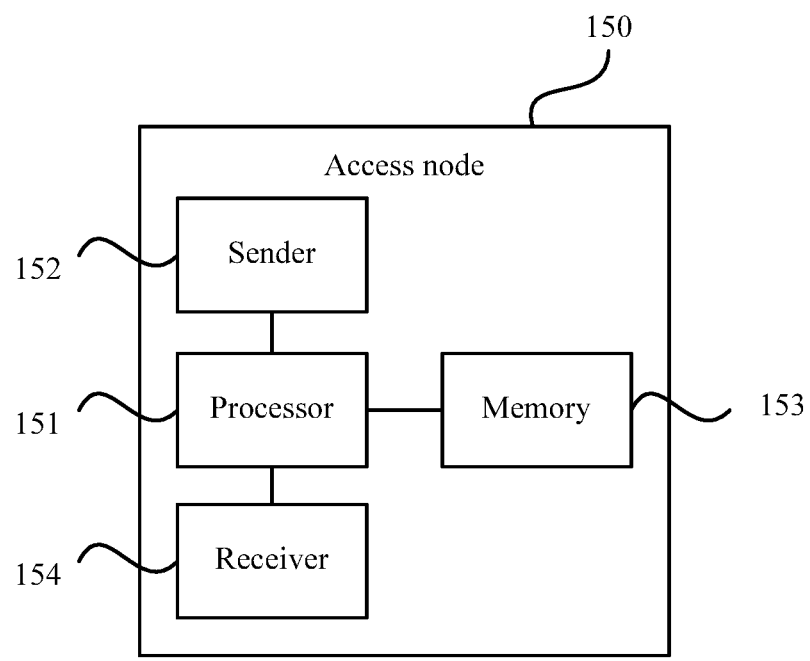
FIG. 15 is a schematic structural diagram of an access node according to Embodiment 13.

As shown in FIG. 14, the IP hard disk 140 includes a receiving unit 141 configured to receive a data operation instruction with respect to a target virtual storage partition, where the data operation instruction includes at least a partition operation type and a partition identifier of a to-be-operated virtual storage partition; and an operation unit 142 configured to scan, according to the partition identifier of the target virtual storage partition, for several key values included in the target virtual storage partition, and perform an operation on the several key values one by one according to the partition operation type.

In a possible implementation manner of the present disclosure, to implement migration of a key value, the receiving unit 141 is configured to receive a data migration instruction with respect to the target virtual storage partition; and the operation unit 142 includes an establishment module 1421 configured to establish a communication channel with a target IP hard disk according to the data migration instruction; and a migration operation module 1422 configured to scan, according to the partition identifier of the target virtual storage partition, for the several key values included in the target virtual storage partition, and send the several key values obtained by scanning to the target IP hard disk.

In another possible implementation manner of the present disclosure, to implement deletion of a key value, the receiving unit 141 is configured to receive a delete data instruction with respect to the target virtual storage partition; and the operation unit 142 includes a deletion operation module 1423 configured to delete, one by one according to the partition identifier of the target virtual storage partition, the several key values that are obtained by scanning and that are included in the target virtual storage partition.

In another possible implementation manner of the present disclosure, to implement reading of a key value, the receiving unit 141 is configured to receive a read data instruction with respect to the target virtual storage partition; and the operation unit 142 includes a read operation module 1424 configured to send, to a target device one by one according to a partition identifier of the target virtual storage partition, several key values that are obtained by scanning and that are included in the target virtual storage partition.

In another possible implementation manner of the present disclosure, to write a key value into a virtual storage partition, the IP hard disk 140 further includes a write unit 143 configured to write, according to the to-be-written-into partition identifier and the primary key, the to-be-written key value into a virtual storage partition corresponding to the to-be-written-into partition identifier.

Embodiment 13

Corresponding to the foregoing data operation method for an IP hard disk, the present disclosure further provides an access node 150, which is applied to a cluster that includes an IP hard disk. The IP hard disk includes several virtual storage partitions, and each virtual storage partition is provided with a partition identifier; each virtual storage partition stores several key values; each key value includes at least a primary key and a partition identifier that is set for a virtual storage partition that stores the key value.

As shown in FIG. 11, the access node 150 includes a processor 151 configured to determine, according to the partition routing table, a first IP hard disk corresponding to a target virtual storage partition, where the partition routing table stores a correspondence between a virtual storage partition and an IP hard disk; a sender 152 configured to deliver a data operation instruction to the first IP hard disk, where the data operation instruction includes at least a partition operation type and a partition identifier of a to-be-operated virtual storage partition, so that the first IP hard disk performs, one by one according to the partition operation type, an operation on several key values included in the target virtual storage partition, where the processor 151 is further configured to update the partition routing table according to an operation result; and a memory 153 configured to store the partition routing table.

According to the access node provided by this embodiment of the present disclosure, a partition routing table is used to manage a correspondence between a virtual storage partition and an IP hard disk, so that the access node sends an operation instruction that is with respect to one virtual storage partition and that enables, based on an association between a virtual storage partition and a primary key that are included in a key value, an IP hard disk to obtain multiple key values in the one virtual storage partition, thereby reducing a quantity of operation instructions delivered by the access node during data operations, reducing an amount of communication between the access node and the IP hard disk and occupied resources of the access node, and improving work efficiency of the access node.

To further implement batch migration of key values in an IP hard disk, in a possible implementation manner of the present disclosure, the sender 152 is configured to deliver a data migration instruction to the first IP hard disk, so that the first IP hard disk establishes a communication channel with a target IP hard disk according to the data migration instruction and migrates several key values included in the target virtual storage partition to the target IP hard disk one by one.

The processor 151 is configured to change, in the partition routing table, the first IP hard disk corresponding to the target virtual storage partition to the target IP hard disk.

To further implement batch deletion of key values in an IP hard disk, in another possible implementation manner of the present disclosure, the sender 152 is configured to deliver a delete data instruction to the first IP hard disk, so that the first IP hard disk deletes, one by one according to the delete data instruction, several key values included in the target virtual storage partition.

The processor 151 is configured to delete a correspondence between the target virtual storage partition and the first IP hard disk from the partition routing table.

To implement batch reading of key values in an IP hard disk, in another possible implementation manner of the present disclosure, the access node 150 further includes a receiver 154.

The sender 152 is configured to deliver a read data instruction to the first IP hard disk, so that the first IP hard disk sends, one by one according to the read data instruction, several key values included in the target virtual storage partition to a target device.

The receiver 154 is configured to receive one by one the several key values that are included in the target virtual storage partition and that are sent by the first IP hard disk according to the read data instruction.

Afterwards, the sender 152 is further configured to send the received several key values to the target device.

The processor 151 is configured to maintain a correspondence between the target storage partition and the first IP hard disk in the partition routing table.

To maintain batch writing of data in an IP hard disk, an association among a key value, a virtual storage partition, and an IP hard disk is implemented for the writing. The receiver 154 is further configured to receive data that needs to be written into a to-be-written-into IP hard disk.

The processor 151 is further configured to allocate, to the data, a primary key and a to-be-written-into partition identifier corresponding to the primary key, to form a to-be-written key value that includes the primary key and the to-be-written-into partition identifier.

The sender 152 is further configured to send the to-be-written key value to the to-be-written-into IP hard disk, so that the to-be-written-into IP hard disk writes the to-be-written key value into a virtual storage partition corresponding to the to-be-written-into partition identifier.

Embodiment 14

Corresponding to the foregoing data operation method for an IP hard disk, the present disclosure further provides an IP hard disk 160, which is applied to a cluster that includes an IP hard disk. The IP hard disk includes several virtual storage partitions, and each virtual storage partition is provided with a partition identifier; each virtual storage partition stores several key values; each key value includes at least a primary key and a partition identifier that is set for a virtual storage partition that stores the key value.

Figure 16:
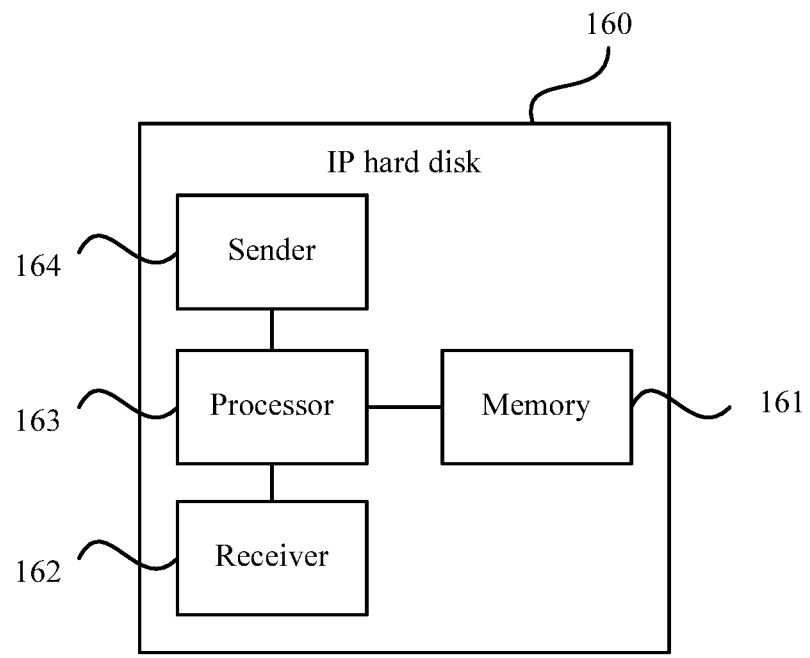
FIG. 16 is a schematic structural diagram of an IP hard disk according to Embodiment 14.

As shown in FIG. 16, the IP hard disk 160 includes a memory 161, where the memory 161 is divided into several virtual storage partitions, and each virtual storage partition stores several key values; a receiver 162 configured to receive a data operation instruction with respect to a target virtual storage partition, where the data operation instruction includes at least a partition operation type and a partition identifier of a to-be-operated virtual storage partition, and a correspondence between the target virtual storage partition and a to-be-operated IP hard disk is stored in a partition routing table; and a processor 163 configured to scan, according to the partition identifier of the target virtual storage partition, for several key values included in the target virtual storage partition, and perform an operation on the several key values one by one according to the partition operation type.

According to the IP hard disk provided by this embodiment of the present disclosure, a partition routing table is used to manage a correspondence between a virtual storage partition and an IP hard disk, so that an access node sends an operation instruction that is with respect to one virtual storage partition and that enables, based on an association between a virtual storage partition and a primary key that are included in a key value, an IP hard disk to obtain multiple key values in the one virtual storage partition, thereby reducing a quantity of operation instructions delivered by the access node during data operations, reducing an amount of communication between the access node and the IP hard disk and occupied resources of the access node, and improving work efficiency of the access node.

To implement migration of a key value, in a possible implementation manner of the present disclosure, the IP hard disk 160 further includes a sender 164.

The receiver 162 is configured to receive a data migration instruction with respect to the target virtual storage partition.

The processor 163 is configured to establish, according to the data migration instruction, a communication channel with a target IP hard disk using the sender 164 and the receiver 162.

The processor 163 is configured to scan, according to the partition identifier of the target virtual storage partition, for several key values included in the target virtual storage partition.

The sender 164 is further configured to send the several key values obtained by scanning to the target IP hard disk one by one.

To implement deletion of a key value, in another possible implementation manner of the present disclosure, the receiver 162 is configured to receive a delete data instruction with respect to the target virtual storage partition.

The processor 163 is configured to delete, one by one according to the partition identifier of the target virtual storage partition, the several key values that are obtained by scanning and that are included in the target virtual storage partition.

To implement reading of a key value, in another possible implementation manner of the present disclosure, the receiver 162 is configured to receive a read data instruction with respect to the target virtual storage partition.

The processor 163 is configured to scan, according to the partition identifier of the target virtual storage partition, for several key values included in the target virtual storage partition.

The sender 164 is configured to send the key values obtained by scanning to a target device.

To write a key value into an IP hard disk, the receiver 162 is further configured to receive a to-be-written key value, where the to-be-written key value includes a primary key and a to-be-written-into partition identifier corresponding to the primary key.

The processor 163 is further configured to write, according to the to-be-written-into partition identifier and the primary key, the to-be-written key value into a virtual storage partition corresponding to the to-be-written-into partition identifier.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data operation method for an internet protocol (IP) hard disk, wherein the method is applied to a storage system and comprises:
   receiving, by a first IP hard disk of the storage system, a data migration instruction from an access node of the storage system, wherein the data migration instruction comprises an identifier of a target virtual storage partition, and the first IP hard disk comprises the target virtual storage partition;
   performing, by the first IP hard disk, matching between the identifier of the target virtual storage partition and key values stored by the first IP hard disk, wherein each key value of the key values matching the identifier of the target virtual storage partition comprises a primary key that uses the identifier of the target virtual storage partition as a prefix; and
   obtaining and reading data in the target virtual storage partition from the key values matching the identifier of the target virtual storage partition.

2. A data operation method for a storage system, comprising:
   sending, by an access node of the storage system, a data migration instruction to a first internet protocol (IP) hard disk of the storage system, wherein the data migration instruction comprises an identifier of a target virtual storage partition, the data migration instruction is used to instruct data in the target virtual storage partition to be migrated to a second IP hard disk of the storage system, and the first IP hard disk comprises the target virtual storage partition; and
   receiving, by the first IP hard disk, the data migration instruction;
   performing, by the first IP hard disk, matching between the identifier of the target virtual storage partition and key values stored by the first IP hard disk, wherein each key value of the key values matching the identifier of the target virtual storage partition comprises a primary key that uses the identifier of the target virtual storage partition as a prefix;
   obtaining and reading data in the target virtual storage partition from the key values matching the identifier of the target virtual storage partition; and
   writing the data in the target virtual storage partition into the second IP hard disk.

3. The method according to claim 2, wherein the access node stores a correspondence between the identifier of the target virtual storage partition and the IP hard disk, and wherein after writing, by the first IP hard disk, the data in the target virtual storage partition into the second IP hard disk, the method further comprises changing, by the access node, a correspondence between the identifier of the target virtual storage partition and the first IP hard disk to the correspondence between the identifier of the target virtual storage partition and the second IP hard disk.

4. The method according to claim 3, wherein sending, by the access node, the data migration instruction to the first IP hard disk comprises:
   determining, by the access node according to the correspondence between the identifier of the target virtual storage partition and the IP hard disk, that an IP hard disk in which the target virtual storage partition is located is the first IP hard disk; and
   sending the data migration instruction to the first IP hard disk.

5. A storage system, comprising:
   an access node; and
   at least two internet protocol (IP) hard disks comprising a first IP hard disk and a second IP hard disk,
   wherein the access node is configured to send a data migration instruction to a first IP hard disk, wherein the data migration instruction comprises an identifier of a target virtual storage partition, wherein the data migration instruction is used to instruct data in the target virtual storage partition to be migrated to a second IP hard disk, wherein the first IP hard disk comprises the target virtual storage partition, and wherein the first IP hard disk is configured to:
   perform matching between the identifier of the target virtual storage partition and key values stored by the first IP hard disk, wherein each key value of the key values matching the identifier of the target virtual storage partition comprises a primary key that uses the identifier of the target virtual storage partition as a prefix;
   obtain and read data in the target virtual storage partition from the key values matching the identifier of the target virtual storage partition; and
   write the data in the target virtual storage partition into the second IP hard disk.

6. The storage system according to claim 5, wherein the access node stores a correspondence between the identifier of the target virtual storage partition and the first IP hard disk, and wherein the access node is further configured to change the correspondence between the identifier of the target virtual storage partition and the first IP hard disk to a correspondence between the identifier of the target virtual storage partition and the second IP hard disk.

* * * * *